(12) United States Patent
Kim et al.

(10) Patent No.: US 12,214,769 B2
(45) Date of Patent: Feb. 4, 2025

(54) METHOD AND SYSTEM FOR HEATING COORDINATION

(71) Applicant: GM GLOBAL TECHNOLOGY OPERATIONS LLC, Detroit, MI (US)

(72) Inventors: Kee Y. Kim, Ann Arbor, MI (US); Anthony H. Heap, Ann Arbor, MI (US); Yiran Hu, Shelby Township, MI (US); Benjamin H. Daavettila, Calument, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 238 days.

(21) Appl. No.: 17/854,689

(22) Filed: Jun. 30, 2022

(65) Prior Publication Data

US 2024/0001905 A1   Jan. 4, 2024

(51) Int. Cl.
| | | |
|---|---|---|
| *B60H 1/02* | (2006.01) | |
| *B60W 10/06* | (2006.01) | |
| *B60W 10/08* | (2006.01) | |
| *B60W 10/30* | (2006.01) | |
| *F01N 5/02* | (2006.01) | |

(52) U.S. Cl.
CPC ............... *B60W 10/30* (2013.01); *B60H 1/02* (2013.01); *B60W 10/06* (2013.01); *B60W 10/08* (2013.01); *F01N 5/02* (2013.01)

(58) Field of Classification Search
CPC ......... F01N 5/02; B60W 10/30; B60W 10/08; B60W 10/06; B60H 1/02
See application file for complete search history.

(56) References Cited

U.S. PATENT DOCUMENTS

| | | | |
|---|---|---|---|
| 7,950,368 B2 * | 5/2011 | Pursifull | F02P 5/1508 |
| | | | 123/406.35 |
| 8,600,615 B2 | 12/2013 | Martini et al. | |
| 9,334,783 B2 * | 5/2016 | Pursifull | F01N 5/02 |
| 9,404,409 B2 * | 8/2016 | Pursifull | F02P 5/15 |
| 10,316,801 B2 * | 6/2019 | Zhang | F02M 26/04 |
| 10,323,587 B2 * | 6/2019 | Schwartz | F01N 3/0205 |
| 10,968,879 B2 * | 4/2021 | Pursifull | F02D 37/02 |

\* cited by examiner

*Primary Examiner* — Gonzalo Laguarda
(74) *Attorney, Agent, or Firm* — Quinn IP Law

(57) ABSTRACT

A method for heat coordination is provided. The method includes operating a propulsion system that generates heat as wasted power, operating a device utilizing the heat generated by the propulsion system, and operating a heat transfer system configured for transferring the heat generated by the propulsion system from the propulsion system to the device. The method further includes, within a computerized processor, determining a minimum useful waste thermal power to operate the device, monitoring a desired output torque for the propulsion system, and utilizing a cost-based determination to determine a propulsion system operating point based upon the desired output torque and the minimum useful waste thermal power to operate the device. The method further includes utilizing the propulsion system operating point to control the propulsion system.

20 Claims, 4 Drawing Sheets

METHOD AND SYSTEM FOR HEATING COORDINATION

INTRODUCTION

The disclosure generally relates to a method and system for heating coordination.

A vehicle includes a system or a plurality of systems configured for propulsion. Vehicles including an exemplary internal combustion engine and additionally an electric machine useful to provide propulsion may be described as a hybrid vehicle.

Vehicles may include a climate control system useful to control temperature within a passenger cabin of the vehicle. Heat may be generated by the vehicle, and this heat may be utilized to selectively provide a flow of warm air to the passenger cabin. Vehicles may include a device configured for defrosting the windshield in wintertime.

SUMMARY

A method for heat coordination is provided. The method includes operating a propulsion system that generates heat as wasted power, operating a device utilizing the heat generated by the propulsion system, and operating a heat transfer system configured for transferring the heat generated by the propulsion system from the propulsion system to the device. The method further includes, within a computerized processor, determining a minimum useful waste thermal power to operate the device, monitoring a desired output torque for the propulsion system, and utilizing a cost-based determination to determine a propulsion system operating point based upon the desired output torque and the minimum useful waste thermal power to operate the device. The method further includes utilizing the propulsion system operating point to control the propulsion system.

In some embodiments, determining the minimum useful waste thermal power to operate the device includes monitoring an ambient temperature, monitoring the heat generated by the propulsion system, and determining the minimum useful waste thermal power to operate the device based upon the ambient temperature and the heat generated by the propulsion system.

In some embodiments, utilizing the cost-based determination to determine the propulsion system operating point based upon the desired output torque and the minimum useful waste thermal power to operate the device includes iteratively analyzing a cost to deliver the desired output torque and provide additional heat to satisfy the minimum useful waste thermal power to operate the device at a plurality of propulsion system candidate operating points. Utilizing the cost-based determination to determine the propulsion system operating point further includes selecting one of the plurality of propulsion system candidate operating points as the propulsion system operating point based upon minimizing the cost.

In some embodiments, operating the propulsion system includes operating an internal combustion engine, and determining the propulsion system operating point includes selecting an engine speed and engine torque operating point.

In some embodiments, operating the propulsion system includes operating an internal combustion engine, and determining the propulsion system operating point includes selecting a spark retard timing to generate heat.

In some embodiments, the method is operated within a vehicle, and the vehicle includes a passenger cabin. Operating the device includes operating a heater core configured for providing heat to the passenger cabin.

In some embodiments, the method is operated within a vehicle, and operating the device includes operating a device configured for defrosting a windshield.

In some embodiments, operating the propulsion system includes operating an electric machine configured for providing an output torque, and determining a propulsion system operating point includes selecting an operating strategy for the electric machine including inefficient operation to generate heat.

In some embodiments, operating the propulsion system includes operating an internal combustion engine and operating an electric machine. Determining the propulsion system operating point includes determining an operating point for the internal combustion engine and determining an operating point for the electric machine.

According to one alternative embodiment, a method for heat coordination in a vehicle is provided. The method includes operating a propulsion system that generates heat as wasted power, operating a device utilizing the heat generated by the propulsion system, and operating a heat transfer system configured for transferring the heat generated by the propulsion system from the propulsion system to the device. The method further includes, within a computerized processor, determining a minimum useful waste thermal power to operate the device, monitoring a desired output torque for the propulsion system, and utilizing a cost-based determination to determine a propulsion system operating point based upon the desired output torque and the minimum useful waste thermal power to operate the device. The method further includes utilizing the propulsion system operating point to control the propulsion system.

In some embodiments, determining the minimum useful waste thermal power to operate the device includes monitoring an ambient temperature, monitoring the heat generated by the propulsion system, and determining the minimum useful waste thermal power to operate the device based upon the ambient temperature and the heat generated by the propulsion system.

In some embodiments, utilizing the cost-based determination to determine the propulsion system operating point based upon the desired output torque and the minimum useful waste thermal power to operate the device includes iteratively analyzing a cost to deliver the desired output torque and provide additional heat to satisfy the minimum useful waste thermal power to operate the device at a plurality of propulsion system candidate operating points. Utilizing the cost-based determination to determine the propulsion system operating point further includes selecting one of the plurality of propulsion system candidate operating points as the propulsion system operating point based upon minimizing the cost.

In one embodiment, the method further includes operating a device configured for defrosting a windshield. Determining the minimum useful waste thermal power is based upon a total heat desired by the device configured for defrosting the windshield.

In some embodiments, operating the propulsion system includes operating an electric machine configured for providing an output torque. Determining a propulsion system operating point includes selecting a power electronics switching strategy for the electric machine including inefficient operation to generate heat.

In some embodiments, operating the propulsion system include operating an internal combustion engine and operating an electric machine. Determining the propulsion system operating point includes determining an operating point for the internal combustion engine and determining an operating point for the electric machine.

A system for heat coordination is provided. The system includes a propulsion system that generates heat as wasted power, a device utilizing the heat generated by the propulsion system, a heat transfer system configured for transferring the heat generated by the propulsion system from the propulsion system to the device. The system further includes a computerized heat coordination controller. The controller includes programming to determine a minimum useful waste thermal power to operate the device, monitor a desired output torque for the propulsion system, and utilize a cost-based determination to determine a propulsion system operating point based upon the desired output torque and the minimum useful waste thermal power to operate the device. The controller further includes programming to utilize the propulsion system operating point to control the propulsion system.

In some embodiments, the programming to utilize the cost-based determination to determine the propulsion system operating point based upon the desired output torque and the minimum useful waste thermal power to operate the device includes programming to iteratively analyze a cost to deliver the desired output torque and provide additional heat to satisfy the minimum useful waste thermal power to operate the device at a plurality of propulsion system candidate operating points. The programming to utilize the cost-based determination to determine the propulsion system operating point further includes programming to select one of the plurality of propulsion system candidate operating points as the propulsion system operating point based upon minimizing the cost.

In some embodiments, the system further includes a vehicle, and the vehicle includes a passenger cabin. The device includes a heater core configured for providing heat to the passenger cabin.

In some embodiments, the system further includes a vehicle, and the device includes a device configured for defrosting a windshield.

In some embodiments, the propulsion system includes an electric machine configured for providing an output torque, and the programming to determine a propulsion system operating point includes programming to select a power electronics switching strategy for the electric machine including inefficient operation to generate heat.

The above features and advantages and other features and advantages of the present disclosure are readily apparent from the following detailed description of the best modes for carrying out the disclosure when taken in connection with the accompanying drawings.

DETAILED DESCRIPTION

Figure 1:
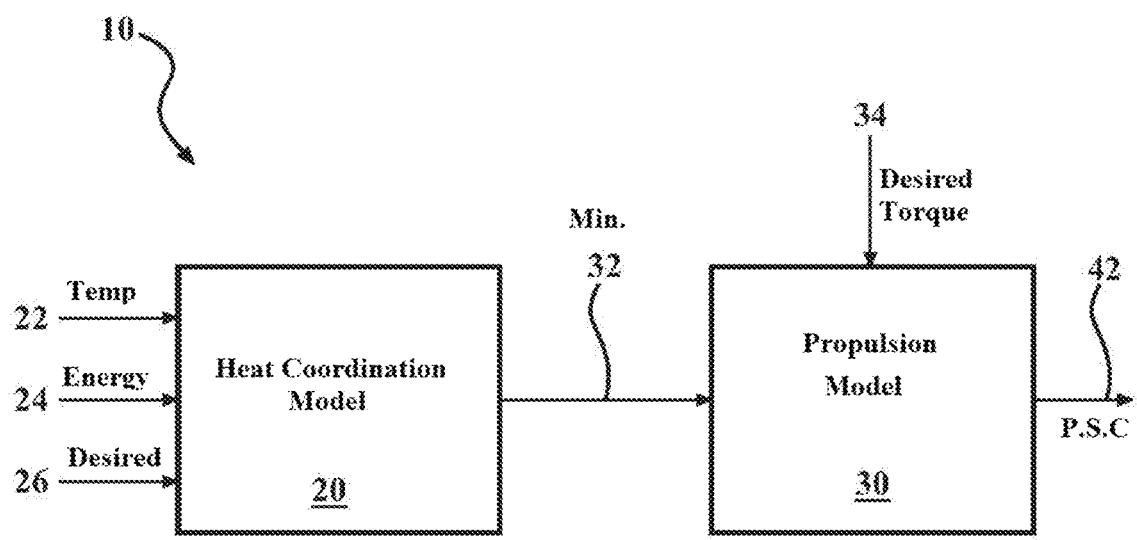
FIG. 1 illustrates an exemplary system 10 for heating coordination, in accordance with the present disclosure.

Hybrid vehicles include excellent energy efficiency. The internal combustion engine and the electric machine configured for providing propulsion through an output torque may operation as a vehicle propulsion system and may be used selectively or in combination to provide propulsion to the vehicle. Heat is produced by the engine when it operates. Heat may be produced when the electric machine generates or receives a torque. Heat may additionally be produced when a battery operates through a charging cycle or a discharging cycle. In some operating conditions, heat produced by the vehicle propulsion system as the vehicle propulsion system provides output torque to meet a driver's torque request (e.g., as provided by an accelerator pedal position) may be sufficient to provide a thermal power useful to heat a device or devices utilizing heat. In other operating conditions, heat produced by the vehicle propulsion system as the vehicle propulsion system provides output torque to meet the driver's torque may not provide sufficient thermal power useful to heat the devices utilizing heat.

Heat may be managed within a propulsion system through use of a heat transfer system. The heat transfer system may include liquid coolant provided in a coolant system. In another example, the heat transfer system may include a system including a refrigerant loop. A flow of coolant may be provided through an engine to draw heat away from the engine. In another example, a battery pack or an electric machine may include refrigerant flowing through or past the device to draw heat away from the device. The heat in the refrigerant or coolant may then be rejected from the system through a radiator device that expels the heat to ambient air. Some of the refrigerant or coolant may instead be routed through a heater core or other heating device to provide heat to a portion or system of the vehicle.

A climate control system of a vehicle includes a heater core which includes a heat transfer device useful for providing heat and raising a temperature of a flow of air through the heater core. This flow of air may be utilized to increase a temperature or provide heat to the passenger cabin. A capacity of the heater core to provide heat to the passenger cabin is limited based upon an amount of heat provided to the heater core. Thermal power useful to provide sufficient heat or a desired amount of heat to the heater core to elevate a temperature of the passenger cabin to a desired temperature may depend upon a number of factors, including ambient temperature, sun-load, a number of occupants in the passenger compartment, etc. The heat provided to the heater core may be managed or coordinated with the operation of propulsion system according to the disclosed method and system. In one embodiment, the desired amount of heat to the heater core may include an amount of heat useful to defrost a windshield with warm air from the heater core within a set period of time.

In addition to heating a passenger cabin, other systems in a vehicle may utilize heating. The heat provided to these other systems may be similarly managed or coordinated with operation of the propulsion system. For example, the disclosed method and system may be utilized to manage desired heat provided to a device configured for defrosting a windshield, a heated windshield washer fluid system to prevent the fluid from freezing in wintertime, and/or to provide a heated fluid upon the windshield and to a battery heating system useful to initially heat a battery pack from a cold temperature to an operating temperature.

A method and system are provided for heating coordination for a powertrain or a vehicle. The method includes operating a propulsion system that generates heat as wasted power, operating a device utilizing the heat generated by the propulsion system, and operating a heat transfer system configured for transferring the heat generated by the propulsion system from the propulsion system to the device. The method further includes, within a computerized processor, monitoring the heat generated by the propulsion system, determining a minimum useful waste thermal power to operate the device, and monitoring a desired output torque for the propulsion system. The method further includes, within the computerized processor, determining a difference between the minimum useful waste thermal power to operate the device and the heat generated by the propulsion system as wasted power. The difference represents a shortfall or deficiency in heat provided by the propulsion system as compared to the minimum useful waster thermal power to operate the device. The method further includes, within the computerized processor, utilizing a cost-based determination to determine a propulsion system operating point based upon the desired output torque and the difference between the minimum useful waste thermal power to operate the device and the heat generated by the propulsion system. The propulsion system operating point is selected to satisfy both the desired output torque and the shortfall represented by the difference. The method further includes utilizing the propulsion system operating point to control the propulsion system.

In one embodiment, an ambient air temperature, a thermal energy of a heat transfer system, and a total heat desired for use by the devices utilizing heat of the propulsion system are provided to a computerized heat coordination model to determine a minimum useful thermal power deficiency to heat the devices utilizing heat value or a minimum useful thermal power deficiency value. This minimum useful thermal power deficiency value describes a shortfall of heat rejected from the propulsion system as compared to an amount of heat required to make the devices utilizing the heat operate properly. This minimum useful thermal power deficiency value is provided in addition to a driver's torque request to a propulsion system model, such that operation of the propulsion system may be commanded to provide desired propulsion and desired operation of the devices utilizing heat. In other words, air temperature, a measure of heat currently available in the heat transfer system, and a total heat desired to be delivered to devices utilizing heat from the heat transfer system may be utilized together to identify a deficiency or shortfall in heat delivered by the propulsion system, such that operation of the propulsion system may be altered to satisfy the deficiency.

According to one embodiment, a cabin heating strategy in a hybrid vehicle may include determining the most efficient engine operating point that creates necessary thermal power to heat the cabin. The disclosed method and system provide an interface that represents a minimal useful thermal power to the hybrid powertrain optimization function to serve cabin heating. The disclosed method and system may additionally determine an optimal engine operating point that creates the minimal useful thermal power provided by adding a thermal power cost function in the optimization.

Under some conditions, the optimal engine operating point may include selecting particular operation of the engine. The optimal engine operating point may include selecting an engine speed and engine torque operating point that delivers a desired propulsion operation and that delivers a desired amount of heat. Different engine speeds and torque have intrinsically different heat outputs. Operation of the engine within a selected range of the controlled operation may provide sufficient thermal power useful to heat the devices of the vehicle utilizing heat. Under such circumstances, the engine may simply be controlled according to programmed efficient control strategies, with an operating point selected based upon desired output torque and heat output of the engine. Further, efficiency of the engine may be altered or intentionally lowered to change heat output of the engine. The engine may include programmed or controlled operation including engine valve timing and control strategies, injection control strategies, and spark control strategies useful to provide maximum fuel efficiency from the engine. By adjusting these control strategies away from the maximum fuel efficiency settings, for example, by retarding a spark timing, more of the energy released by combustion may be wasted as heat as opposed to being transformed into mechanical energy through the output shaft.

Similarly, hybrid control strategies may be utilized or modified to control heat output from a hybrid propulsion system. For example, at a particular output shaft torque and speed, the hybrid control strategy may command operation with propulsion provided by an electric machine. In this example, based upon a minimum useful waste thermal power value, the hybrid control strategy may instead command operation with propulsion provided by a combination of the electric machine and an engine operating at maximum fuel efficiency to produce extra heat to meet the minimum useful waste thermal power value. In one embodiment, an electric machine in a hybrid vehicle may be utilized to provide torque to resist turning of the engine crankshaft, such that the engine burns extra fuel and creates extra heat to turn as a result of the torque provided by the electric machine. A hybrid strategy or hybrid control example may be that one may run the engine at an increased or higher than typical speed and/or torque and burn more fuel than typical to create the excess heat. Not only does running the engine at a higher speed and torque create more heat from the engine, it also generates excess electrical energy in the electric machine which may be stored in the battery for future use.

Under other conditions, for example when operation of the engine at maximum fuel efficiency fails to provide sufficient heat or thermal power to heat the devices utilizing heat from the propulsion system, the optimal engine operating point that satisfies the minimum useful thermal power deficiency may not include operation of the engine at maximum fuel efficiency. Rather, the optimal engine operating point may include operation with less than maximum fuel efficiency, for example, by retarding a spark timing, in order to generate extra heat.

The disclosed method and system may be utilized for other features and propulsion systems such as managing intentionally operating an electric machine inefficiently on a battery electric vehicle without an engine to generate extra heat. In one embodiment, intentionally operating the electric machine inefficiently may include selecting a power electronics switching strategy for the electric machine including inefficient operation to generate heat. In one electric vehicle example, the vehicle may operate with multiple motors. One may run the motors inefficiently and create an increased amount of heat while producing the total torque that the drivers is requesting.

Referring now to the drawings, wherein like reference numbers refer to like features throughout the several views, FIG. 1 illustrates an exemplary system 10 for heating coordination. A computerized heat coordination model 20 and a computerized propulsion system model 30 are illustrated. The heat coordination model 20 receives inputs including ambient temperature sensor data 22, a thermal energy of a heat transfer system 24, and a desired heat from the devices utilizing heat 26. The thermal energy of the heat transfer system 24 may be determined based upon a temperature and flow rate of heat transfer available in the system for delivery to devices utilizing heat. In one embodiment, the desired heat from the devices utilizing heat 26 may include a desired heater core heat value. In another embodiment, the desired heat from the devices utilizing heat 26 may include a heated windshield wiper fluid heater heat value and/or a battery heating system heat value. The desired heat from the devices utilizing heat 26 may include a desired heat value for any device or system utilizing heat from the propulsion system. The model utilizes these inputs to determine a minimum useful waste thermal power value 32, which is provided to the propulsion system model 30. The propulsion system model 30 receives as inputs the minimum useful waste thermal power value 32 and a driver's torque request 34 indicating a desired output torque to be delivered by the propulsion system. The propulsion system model 30 utilizes these inputs to determine a propulsion system commend 42 useful to provide a desired output torque (desired propulsion) and desired operation of the devices utilizing heat.

The provided propulsion system model 30 is useful to control a propulsion system of an exemplary vehicle, boat, or other mobile object. An alternative power generation system model may be utilized instead, for example, to coordinate heat within a power generation system including an engine and/or an electric machine providing an output torque.

A cost-based method may be defined to converge to an optimal answer or minimum. In the current disclosure, a cost-based method may be utilized to determine a powertrain operating point delivering a desired output torque and a desired amount of heat at a lowest cost. In one embodiment, the lowest cost may be defined as a lowest energy expenditure, such as a lowest fuel expenditure and/or a lowest amount of electrical energy spent. When one evaluates a candidate point, the expected waste heat at that evaluated point may be calculated. The cost of the candidate point may be determined to include how much power is deficient as compared to the power that is desired and useful. This cost is added to the other system efficiency cost to be the total cost. The search method iterates the evaluation for multiple candidate points to converge to an answer that has the lowest cost. This determined cost may be added to other system costs, such as the cost to deliver a desired output torque. One may additionally represent the cost of operating points for not producing the desired heat.

Figure 2:
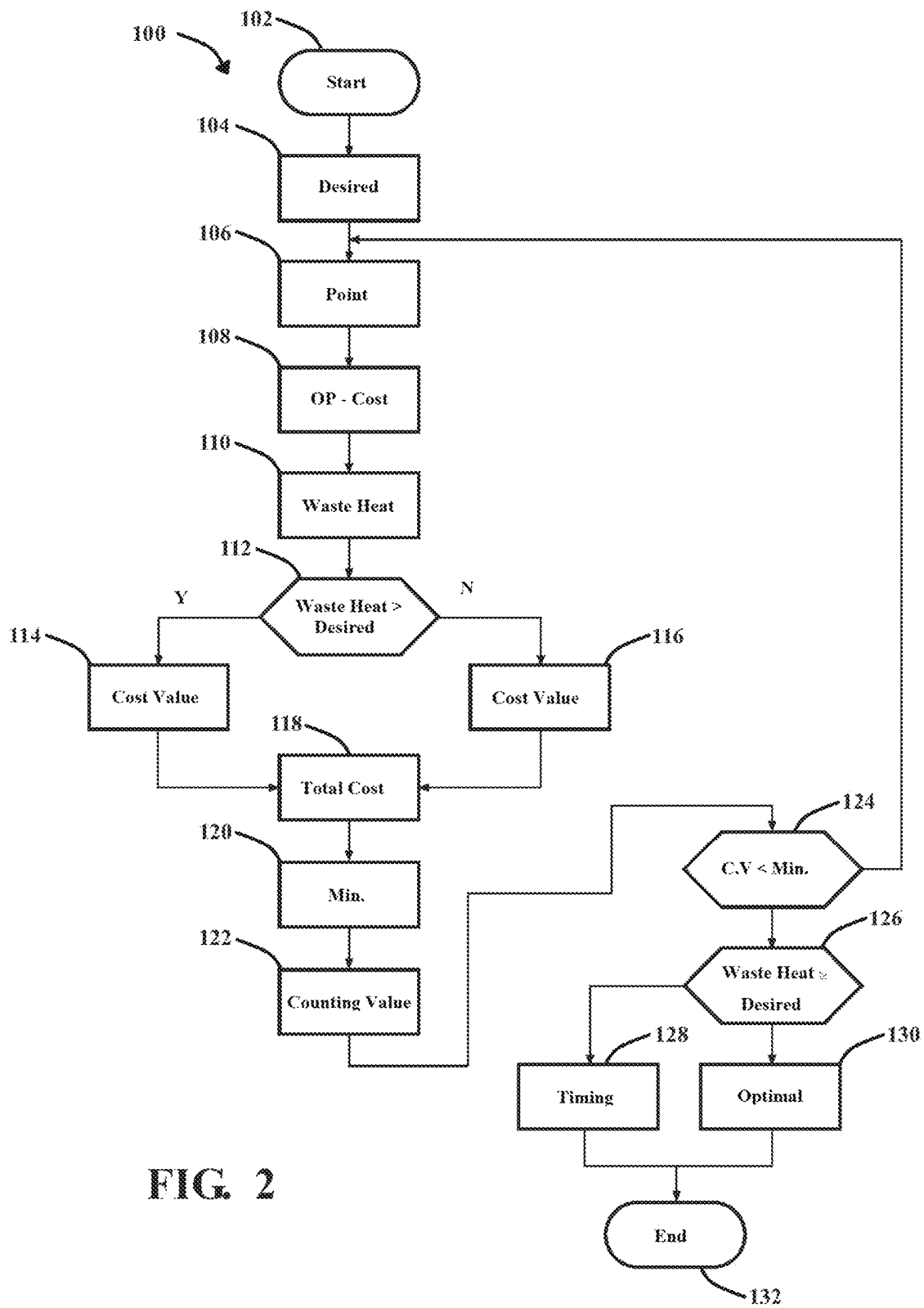
FIG. 2 is a flowchart illustrating operation of a method for heating coordination, in accordance with the present disclosure.

FIG. 2 is a flowchart illustrating operation of a method 100 for determining an optimized operating point for the disclosed heating coordination. The method 100 may be described as utilizing a cost-based determination to determine a propulsion system operating point based upon the desired output torque and the difference between the minimum useful waste thermal power to operate the device and the heat generated by the propulsion system. The method 100 includes utilizing the cost-based determination to determine the propulsion system operating point based upon the desired output torque and the difference between the minimum useful waste thermal power to operate the device and the heat generated by the propulsion system. The cost-based determination includes iteratively analyzing a cost to deliver the desired output torque and provide additional heat to satisfy the difference between the minimum useful waste thermal power to operate the device and the heat generated by the propulsion system at a plurality of propulsion system candidate operating points and selecting one of the plurality of propulsion system candidate operating points as the propulsion system operating point based upon minimizing the cost.

The method 100 starts at step 102. At step 104, a determination is made regarding a total heat desired by devices utilizing heat of the propulsion system. At step 106, an initial propulsion system candidate operating point or an initial present candidate point including an engine operating point is selected based upon a driver's torque request. At step 108, system optimization costs for the engine at the engine operating point are evaluated for the present candidate point. At step 110, power output of the propulsion system wasted as heat is evaluated. At step 112, a determination is made whether the heat generated as wasted power at the present candidate point is greater than the total heat desired by devices utilizing heat of the propulsion system. If the heat generated as wasted power is greater than the total heat desired by devices utilizing heat of the propulsion system, then no deficiency of thermal power is evident, and at step 114, a heat power cost value at the present candidate point may be set to zero. If the heat generated as wasted power is not greater than the total heat desired by devices utilizing heat of the propulsion system, at step 116, a heat power cost value at the present candidate point may be set to equal a cost factor times a deficiency or difference between the total heat desired by devices utilizing heat of the propulsion system and the heat generated as wasted power. At step 118, a total cost at the present candidate point may be defined to include the heat power cost value determined in either step 114 or step 116 plus the system optimization costs evaluated at step 108. At step 120, a minimum total cost at the present candidate point is set to include a smaller of two values: the total cost at the present candidate point determined in step 118 or a minimum total cost determined at a previous iteration of the method 100 at a previous candidate point. At step 122, a candidate counting value is advanced, with a new candidate point becoming the present candidate point. At step 124, a determination is made whether the candidate counting value of step 122 equals a search criteria complete counting value. In one exemplary embodiment, the search criteria complete counting value may be set to thirty, meaning that thirty candidate points are evaluated. Other values may be utilized. If the counting value does not equal the search criteria complete counting value, the method 100 returns to step 106 to reiterate a portion of the method 100 at the new present candidate point. If the counting value does equal the search criteria complete counting value, the method 100 advances to step 126, where a determination is made whether the heat generated as wasted power is greater than or equal to the total heat desired by devices utilizing heat of the propulsion system. If the heat generated as wasted power is greater than or equal to the total heat desired by devices utilizing heat of the propulsion system, the method 100 advances to step 128, where a spark timing of the engine may be retarded to increase heat generated as wasted heat. If the heat generated as wasted power is greater than or equal to the total heat desired by devices utilizing heat of the propulsion system, the method 100 advances to step 130, where an optimal propulsion system operating point delivering the total heat desired by devices utilizing heat of the propulsion system at minimum cost is defined and utilized to control the propulsion system. At step 132, the method 100 ends. The method 100 is provided as an exemplary method for determining an optimized operating point for the disclosed heating coordination. A number of additional or alternative method steps are envisioned, and the disclosure is not intended to be limited to the examples provided.

In a hybrid vehicle to meet a certain drivers request there may be an infinite number of combinations of engine torque and speed points that are feasible. A cost-based method excluding the cost to produce heat may be utilized to optimize an operating point or determine an operating point, for example, consuming a least amount of energy. With the inclusion of the cost-based method including costs associated with providing heat disclosed herein, a cost surface or cost function is different than it would be without the heat-associated costs and therefore an optimal answer is different. Since one cannot evaluate an entirety of the points in a vehicle in real-time, the method 100 of FIG. 2 determines a preferred or desirable operating point, optimized with a lowest cost, with a reduced number of evaluations (for example, 30 evaluations).

Figure 3:
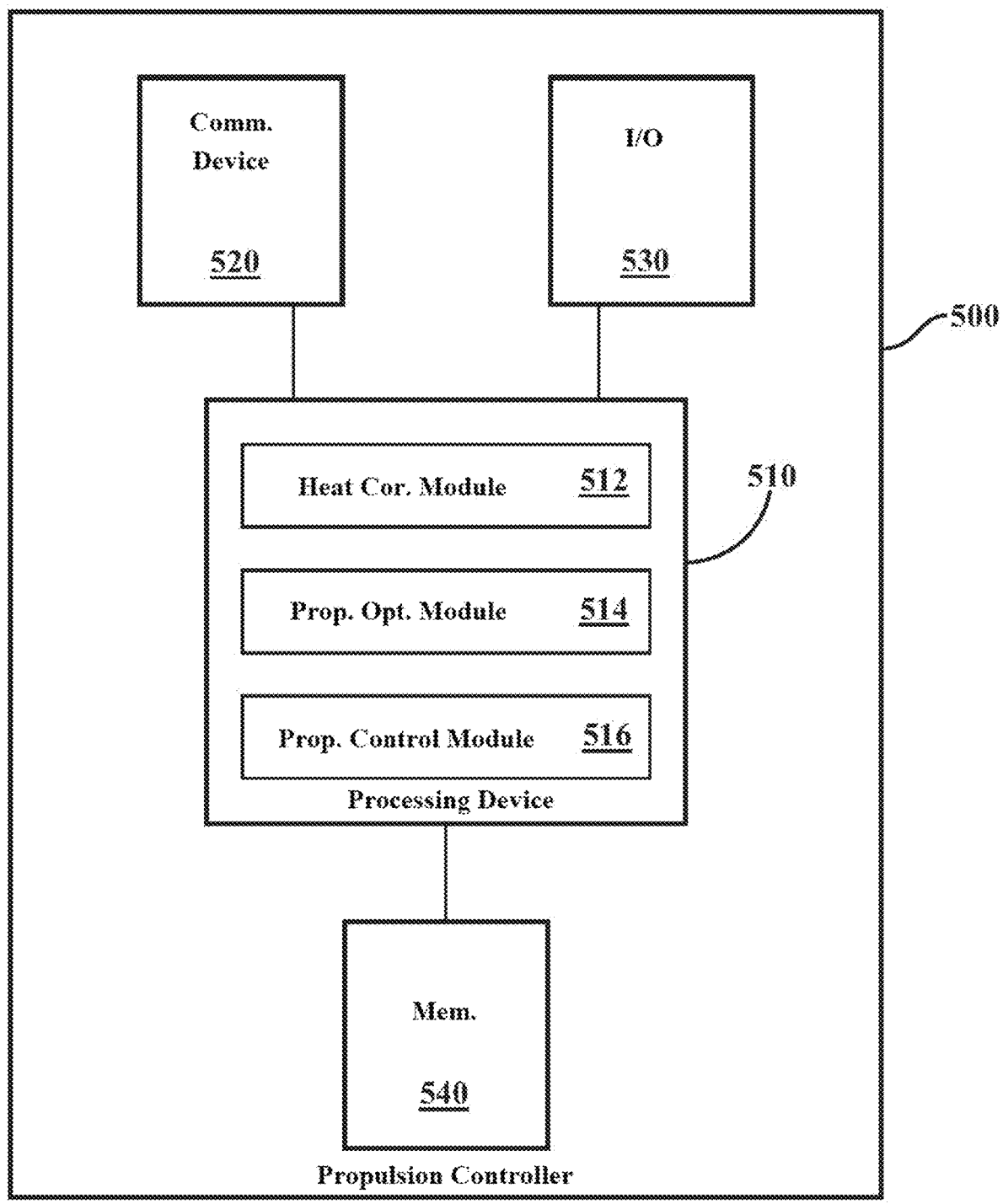
FIG. 3 schematically illustrates an exemplary heat and propulsion controller 500 configured for operating the disclosed method, in accordance with the present disclosure.

FIG. 3 schematically illustrates an exemplary heat and propulsion controller 500 configured for operating the disclosed method. Computerized heat and propulsion controller 500 includes processing device 510, communications device 520, data input output device 530, and memory storage device 540. It is noted that computerized heat and propulsion controller 500 may include other components and some of the components are not present in some embodiments.

The processing device 510 may include memory, e.g., read only memory (ROM) and random-access memory (RAM), storing processor-executable instructions and one or more processors that execute the processor-executable instructions. In embodiments where the processing device 510 includes two or more processors, the processors may operate in a parallel or distributed manner. Processing device 510 may execute the operating system of the computerized heat and propulsion controller 500. Processing device 510 may include one or more modules executing programmed code or computerized processes or methods including executable steps. Illustrated modules may include a single physical device or functionality spanning multiple physical devices. In the illustrative embodiment, the processing device 510 also includes a heat coordination module 512, a propulsion system optimization module 514, and a propulsion system control module 516, which are described in greater detail below.

The data input output device 530 is a device that is operable to take data gathered from sensors and devices throughout the vehicle and process the data into formats readily usable by processing device 510. Data input output device 530 is further operable to process output from processing device 510 and enable use of that output by other devices or control modules throughout the vehicle.

The communications device 520 may include a communications/data connection with a bus device configured to transfer data to different components of the system and may include one or more wireless transceivers for performing wireless communication.

The memory storage device 540 is a device that stores data generated or received by the computerized heat and propulsion controller 500. The memory storage device 540 may include, and is not limited to, a hard disc drive, an optical disc drive, and/or a flash memory drive.

The heat coordination module 512 includes programming to operate the heat coordination model 20 of FIG. 1. Heat coordination module 512 monitors inputs related to operation of devices utilizing heat from the propulsion system and determines whether there is a deficiency or a minimum useful waste thermal power which may be satisfied in order to optimize or provide excellent operation of the devices utilizing heat from the propulsion system. The heat coordination module 512 provides the minimum useful waste thermal power as an output.

The propulsion system optimization module 514 includes programming to operate the propulsion system model 30 of FIG. 1. The propulsion system optimization module 514 may receive the minimum useful waste thermal power from the heat coordination module 512 and may additionally receive an output shaft torque request such as a driver's torque request indicating desired operation of the propulsion system. The propulsion system optimization module 514 may utilize the minimum useful waste thermal power and the output shaft torque request to determine a propulsion system operating point useful to achieve desired operation of the propulsion system and desired operation of devices utilizing heat from the propulsion system at a lowest total cost.

The propulsion system control module 516 may include programming to utilize the propulsion system operating point determined by the propulsion system optimization module 514 to control the propulsion system including an engine and/or an electric machine providing an output torque.

Computerized heat and propulsion controller 500 is provided as an exemplary computerized device capable of executing programmed code to accomplish the methods and processes described herein. A number of different embodiments of computerized heat and propulsion controller 500, devices attached thereto, and modules operable therein are envisioned, and the disclosure is not intended to be limited to examples provided herein.

Figure 4:
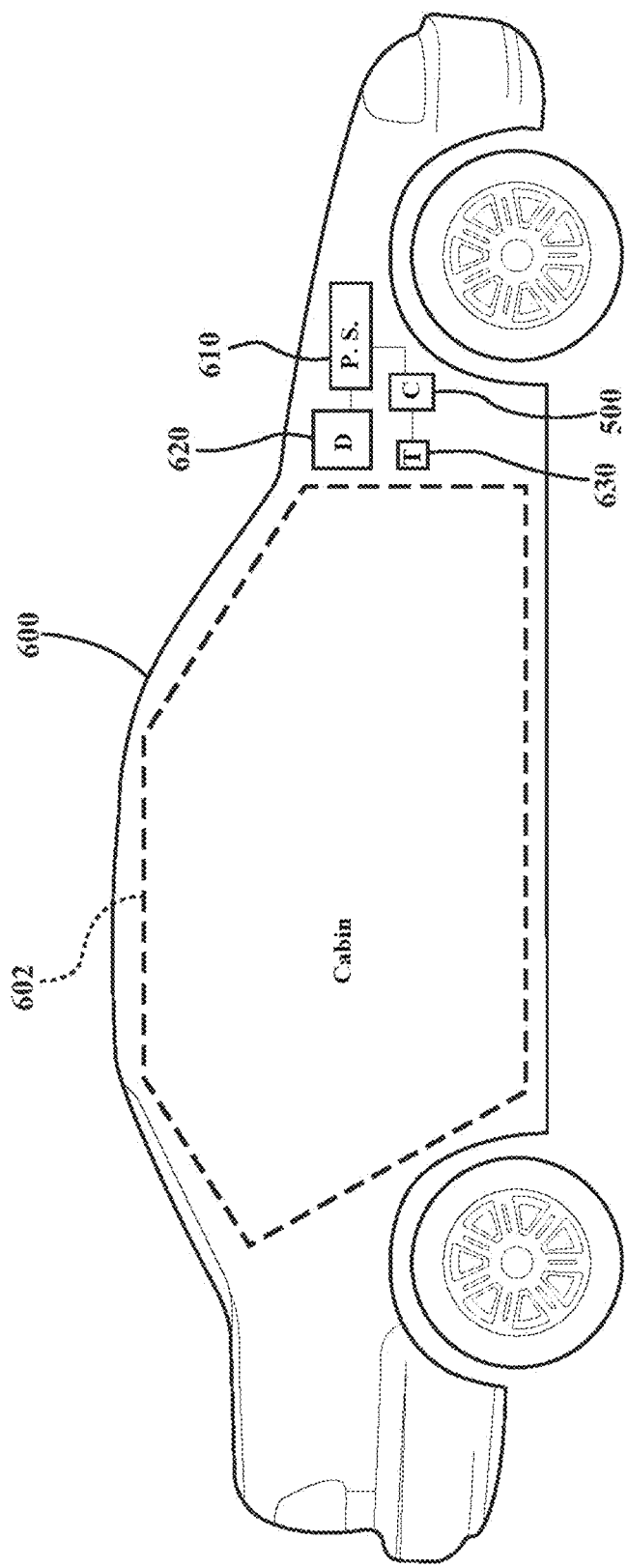
FIG. 4 schematically illustrates an exemplary device including the computerized heat and propulsion controller of FIG. 3, a propulsion system, an ambient temperature sensor, and a device utilizing heat from the propulsion system, in accordance with the present disclosure.

FIG. 4 schematically illustrates an exemplary device 600 including the computerized heat and propulsion controller 500 of FIG. 3, a propulsion system 610, an ambient temperature sensor 630, and a device 620 utilizing heat from the propulsion system 610. The device 600 is illustrated as a vehicle including a passenger cabin 602. The device 620 utilizing heat from the propulsion system 610 may include a heater core useful to heat the passenger cabin 602. The device 620 utilizing heat from the propulsion system 610 may include a device configured for defrosting a windshield, a windshield wiper fluid heating device, and/or a battery pack heating device.

While the best modes for carrying out the disclosure have been described in detail, those familiar with the art to which this disclosure relates will recognize various alternative designs and embodiments for practicing the disclosure within the scope of the appended claims.

What is claimed is:

1. A method for heat coordination, comprising:
    operating a propulsion system that generates heat as wasted power, wherein operating the propulsion system includes operating an internal combustion engine and operating an electric machine both configured to provide output torque for propulsion;
    operating a device utilizing the heat generated by the propulsion system;
    operating a heat transfer system configured for transferring the heat generated by the propulsion system from the propulsion system to the device;

within a computerized processor,
determining a minimum useful waste thermal power to operate the device with a heat coordination model;
monitoring a desired output torque for the propulsion system based on a driver request; and
utilizing a cost-based determination to determine a propulsion system operating point based upon the desired output torque and the minimum useful waste thermal power to operate the device, wherein determining the propulsion system operating point includes determining an operating point for the internal combustion engine and determining an operating point for the electric machine; and
utilizing the propulsion system operating point to control the propulsion system; wherein operating the heat transfer system includes directing a flow of coolant through the internal combustion engine and the electric machine for transferring the heat to the device.

2. The method of claim 1, wherein determining the minimum useful waste thermal power to operate the device includes:
monitoring an ambient temperature;
monitoring the heat generated by the propulsion system; and
determining the minimum useful waste thermal power to operate the device based upon the ambient temperature and the heat generated by the propulsion system.

3. The method of claim 1, wherein utilizing the cost-based determination to determine the propulsion system operating point based upon the desired output torque and the minimum useful waste thermal power to operate the device includes:
iteratively analyzing a cost to deliver the desired output torque and provide additional heat to satisfy the minimum useful waste thermal power to operate the device at a plurality of propulsion system candidate operating points; and
selecting one of the plurality of propulsion system candidate operating points as the propulsion system operating point based upon minimizing the cost and providing a lowest energy expenditure by the propulsion system.

4. The method of claim 1,
wherein determining the propulsion system operating point includes selecting an engine speed and engine torque operating point for the internal combustion engine.

5. The method of claim 1,
wherein determining the propulsion system operating point includes selecting a spark retard timing to generate heat for the internal combustion engine.

6. The method of claim 1, wherein the method is operated within a vehicle;
wherein the vehicle includes a passenger cabin; and
wherein operating the device includes operating a heater core configured for providing heat to the passenger cabin.

7. The method of claim 1, wherein the method is operated within a vehicle; and
wherein operating the device includes operating a first device configured for defrosting a windshield and a second device configured for heating windshield washer fluid.

8. The method of claim 1,
wherein determining the propulsion system operating point includes selecting a power electronics switching strategy for the electric machine to generate an increased amount of heat while providing output torque for propulsion.

9. The method of claim 1, wherein operating the heat transfer system includes directing a flow of coolant through the internal combustion engine, a battery pack, and the electric machine for transferring the heat to the device with the battery pack providing power to the electric machine.

10. The method of claim 1, wherein the device includes a battery heating system configured to heat a battery pack that is configured to provide power to the electric machine.

11. A method for heat coordination in a vehicle, comprising:
operating a propulsion system that generates heat as wasted power, wherein operating the propulsion system includes operating an internal combustion engine and operating an electric machine both configured to provide output torque for propulsion;
operating a device utilizing the heat generated by the propulsion system;
operating a heat transfer system configured for transferring the heat generated by the propulsion system from the propulsion system to the device;
within a computerized processor,
determining a minimum useful waste thermal power to operate the device;
monitoring a desired output torque for the propulsion system; and
utilizing a cost-based determination to determine a propulsion system operating point based upon the desired output torque and the minimum useful waste thermal power to operate the device, wherein determining the propulsion system operating point includes determining an operating point for the internal combustion engine and determining an operating point for the electric machine; and
utilizing the propulsion system operating point to control the propulsion system;
wherein operating the heat transfer system includes directing a flow of coolant through the internal combustion engine and the electric machine for transferring the heat to the device.

12. The method of claim 11, wherein determining the minimum useful waste thermal power to operate the device includes:
monitoring an ambient temperature;
monitoring the heat generated by the propulsion system; and
determining the minimum useful waste thermal power to operate the device based upon the ambient temperature and the heat generated by the propulsion system.

13. The method of claim 11, wherein utilizing the cost-based determination to determine the propulsion system operating point based upon the desired output torque and the minimum useful waste thermal power to operate the device includes:
iteratively analyzing a cost to deliver the desired output torque and provide additional heat to satisfy the minimum useful waste thermal power to operate the device at a plurality of propulsion system candidate operating points; and
selecting one of the plurality of propulsion system candidate operating points as the propulsion system operating point based upon minimizing the cost.

14. The method of claim 11, further comprising operating a device configured for defrosting a windshield; and wherein determining the minimum useful waste thermal power is based upon a total heat desired by the device configured for defrosting the windshield.

15. The method of claim 11,
wherein determining a propulsion system operating point includes selecting a power electronics switching strategy for the electric machine to generate an increased amount of heat while providing output torque for propulsion.

16. A system for heat coordination, comprising:
a propulsion system that generates heat as wasted power, wherein the propulsion system includes an internal combustion engine and an electric machine both configured to provide output torque for propulsion;
a device utilizing the heat generated by the propulsion system;
a heat transfer system configured for transferring the heat generated by the propulsion system from the propulsion system to the device;
a computerized heat coordination controller, including programming to:
　determine a minimum useful waste thermal power to operate the device;
　monitor a desired output torque for the propulsion system;
　utilize a cost-based determination to determine a propulsion system operating point based upon the desired output torque and the minimum useful waste thermal power to operate the device, wherein determining the propulsion system operating point includes determining an operating point for the internal combustion engine and determining an operating point for the electric machine; and
　utilize the propulsion system operating point to control the propulsion system;
wherein operating the heat transfer system includes directing a flow of coolant through the internal combustion engine and the electric machine for transferring the heat to the device.

17. The system of claim 16, wherein the programming to utilize the cost-based determination to determine the propulsion system operating point based upon the desired output torque and the minimum useful waste thermal power to operate the device includes programming to:
　iteratively analyze a cost to deliver the desired output torque and provide additional heat to satisfy the minimum useful waste thermal power to operate the device at a plurality of propulsion system candidate operating points; and
　select one of the plurality of propulsion system candidate operating points as the propulsion system operating point based upon minimizing the cost.

18. The system of claim 16, further comprising a vehicle;
wherein the vehicle includes a passenger cabin; and
wherein the device includes a heater core configured for providing heat to the passenger cabin.

19. The system of claim 16, further comprising a vehicle; and
wherein the device includes a first device configured for defrosting a windshield and a second device configured for heating windshield washer fluid.

20. The system of claim 16, wherein the propulsion system includes:
　an electric machine configured for providing an output torque; and
　wherein the programming to determine a propulsion system operating point includes programming to select a power electronics switching strategy for the electric machine to generate an increased amount of heat while providing output torque for propulsion.

* * * * *